United States Patent
Doko et al.

(10) Patent No.: US 6,186,222 B1
(45) Date of Patent: Feb. 13, 2001

(54) ALUMINUM ALLOY TUBE AND HEAT EXCHANGER, AND METHOD OF METAL-SPRAYING A FILLER ALLOY

(75) Inventors: Takeyoshi Doko; Hirokazu Yamaguchi; Osamu Kato, all of Tokyo; Taketoshi Toyama, Kariya; Kouji Hirakami, Kariya; Akira Uchikawa, Kariya; Takaaki Sakane, Kariya; Homare Koutate, Kariya, all of (JP)

(73) Assignees: The Furukawa Electric Co., Ltd, Tokyo; Denso Corporation, Aichi-ken, both of (JP)

( * ) Notice: Under 35 U.S.C. 154(b), the term of this patent shall be extended for 0 days.

(21) Appl. No.: 09/116,254

(22) Filed: Jul. 16, 1998

(30) Foreign Application Priority Data

Jul. 16, 1997 (JP) ........................................ 9-191296
Nov. 20, 1997 (JP) ........................................ 9-318809

(51) Int. Cl.[7] ........................................ F28F 13/18
(52) U.S. Cl. .................. 165/133; 165/183; 148/24; 29/890.045; 428/553
(58) Field of Search .................... 165/133, 110, 165/161, 183, 184; 29/890.045; 148/24; 428/553

(56) References Cited

U.S. PATENT DOCUMENTS

| | | | | |
|---|---|---|---|---|
| 1,578,254 | * | 3/1926 | Bennett ............................. | 165/184 |
| 3,587,730 | * | 6/1971 | Milton .............................. | 165/110 |
| 3,595,310 | * | 7/1971 | Burne ............................... | 165/161 |
| 3,689,987 | * | 9/1972 | Teague ............................. | 29/527.2 |
| 3,990,862 | * | 11/1976 | Dahl et al. ........................ | 165/133 |
| 4,093,755 | * | 6/1978 | Dahl et al. ........................ | 165/133 |
| 5,732,767 | * | 3/1998 | Saperstein ........................ | 165/133 |
| 5,806,337 | * | 9/1998 | Mabuchi et al. .................. | 165/133 |
| 5,820,698 | * | 10/1998 | Tohma et al. ..................... | 148/24 |
| 5,833,931 | * | 11/1998 | Fromson et al. .................. | 165/133 |
| 5,857,266 | * | 1/1999 | Raybould et al. ................. | 165/133 |
| 5,894,054 | * | 4/1999 | Paruchuri et al. ................ | 165/133 |
| 5,907,761 | * | 5/1999 | Tohma et al. ..................... | 165/133 |

FOREIGN PATENT DOCUMENTS

| | | | | |
|---|---|---|---|---|
| 779769 | * | 7/1957 | (GB) ............................. | 165/184 |
| 63-34495A | | 2/1988 | (JP) . | |
| 2-84261A | | 3/1990 | (JP) . | |
| 6-200344A | | 7/1994 | (JP) . | |

* cited by examiner

*Primary Examiner*—Ira S. Lazarus
*Assistant Examiner*—Terrell McKinnon
(74) *Attorney, Agent, or Firm*—Birch, Stewart, Kolasch & Birch, LLP

(57) ABSTRACT

There is disclosed an aluminum alloy tube whose outer surface is covered with a filler alloy by metal-spraying, wherein the base material of the tube has an uneven rough surface with the depth of 10 μm or more, and the difference between the highest projection of the base material surface and the highest projection of the filler alloy layer covering it is 3 to 25 μm; a heat exchanger, which is assembled by using the tubes; and a method of metal-spraying, which comprises metal-spraying an aluminum alloy filler powder in a melted state, by the high-velocity flame metal-spraying process, in which the filler contains 15 to 50% Si by weight, and the powder is mainly made up of particles whose diameter is 10 μm to 70 μm. The aluminum alloy tube is excellent in brazability and corrosion resistance, and by using the tube, it is possible to assemble a heat exchanger without allowing locally filler-unbonded parts to be formed. Further, according to the method of metal-spraying, it is possible to form a excellent filler alloy layer, and obtain a tube high in brazability and corrosion resistance.

13 Claims, 4 Drawing Sheets

ALUMINUM ALLOY TUBE AND HEAT EXCHANGER, AND METHOD OF METAL-SPRAYING A FILLER ALLOY

FIELD OF THE INVENTION

The present invention relates to an aluminum alloy tube having a filler alloy coated on the outer surface, and more specifically a tube stabilized in brazability, and a heat exchanger wherein the said tube is used. The present invention also relates to a method of metal-spraying (thermal-spraying) a filler alloy that can give, for example, an aluminum alloy tube having excellent brazability.

BACKGROUND OF THE INVENTION

FIG. 1 shows a front view of a parallel-flow-type condenser as an example of an aluminum alloy heat exchanger. Extruded multiple-holed tubes are used as tubes (extruded multiple-holed flat-shape tubes) 1, serving as refrigerant passages; each of the tubes 1 has a corrugated fin 2 brazed thereto, that is a radiator, and that is made of a brazing sheet fin clad with a filler alloy (parts of the repeated sections of the corrugated fins are omitted in FIG. 1); and the tubes 1 and the corrugated fins 2 are integrated by the brazing process, to produce a core 5, that forms the major part. 3 indicates header pipes, through which the tubes 1 communicate with one another. In recent years, in order to make heat exchangers small-sized and light in weight, some production methods are proposed. Among the methods is a production method in which, in place of the corrugate fins 2, which are limited in how thin they can be made, bear fins are used, which are thinner; the outside of the tubes 1 is covered with a filler alloy by metal-spraying, and they are combined and integrated by brazing (JP-A-63-34495 ("JP-A" means unexamined published Japanese patent application) and JP-A-2-84261, alternatively a method in which tubes and fins whose surfaces are metal-sprayed with a filler alloy are assembled into a core and brazing is carried out (JP-A-6-200344).

When it is attempted to produce a heat exchanger by using tubes made by metal-spraying the above extruded tubes with a filler alloy, however, no heat exchanger is industrially satisfactory for practical use in brazing. The reason for that seems to be attributed to the occurrence of the following two problems with brazing.

First is depletion of the filler alloy mentioned. This is a failure apt to occur when conventional brazing is carried out using brazing sheets having a smaller amount of a filler alloy, and this failure is liable to occur particularly in the case of tubes metal-sprayed with a filler alloy. Since the cost of metal-spraying with a filler alloy is high, when a coating of a filler alloy layer is formed by metal-spraying, the thickness of the filler alloy layer is generally 50 g/m² or less, and this quantity is ½ or less of the quantity of the brazing sheet (the cladding ratio of the filler alloy being 10%), whose thickness is 0.4 mm, that is used generally as an electric-resistance weld pipe in heat exchangers. Accordingly, when the metal-sprayed filler alloy is not microscopically and uniformly deposited at the part where the amount of the filler alloy is small, depletion of the filler alloy sometimes occurs as a failure in which the part having a smaller amount of the filler alloy cannot be brazed (no fillet is formed).

Second is the occurrence of locally unbonded parts of heat exchangers. The occurrence of locally unbonded parts is a phenomenon peculiar to tubes metal-sprayed with a filler alloy, which is illustrated schematically in FIG. 2. When tubes 1 metal-sprayed with a filler alloy, and corrugated fins 2, are combined to form a core having several stages, the brazing can be carried out by heating, to effect the brazing with no problems. However, if a core 5 of multi-stage having about 40 stages is intended on a practical scale a part D, where the corrugated fin is not brazed to the tube at all, occurs at places. FIG. 4 indicates a side plate view.

If there is such a locally unbonded part D where a tube 1 and a fin 2 are not connected with each other, not only is the strength of the core 5 lowered as a whole, but also the sacrificial corrosion-preventive (cathodic-protection) effect of the tube 1 by the fin 2 cannot be secured, and the corrosion resistance is lowered greatly. The cause of the occurrence of the locally unbonded part D has not yet been fully clarified.

The most simple conceivable way for preventing the depletion of a filler alloy from occurring is a method wherein the amount of a filler alloy is increased satisfactorily. If there is a satisfactory amount of a filler alloy, the filler alloy goes to everywhere, even if the deposited amount of the filler alloy is uneven. When the amount of a filler alloy is increased, however, locally unbonded parts are liable to occur accordingly, as described below in the case of multi-stage one as mentioned above. Therefore, it is difficult to increase the amount of deposition of a filler alloy.

To solve this, it is conceivable to supply a filler alloy as uniformly as possible. The uniform deposition of a filler alloy should lead to the formation of fillets with a minimum amount of the filler alloy. However, the uniform deposition of a filler alloy was technically difficult in the conventional metal-spraying.

To prevent locally unbonded parts from occurring, it is recommended, in theory, to make the filler alloy applied thinly and to reduce microscopic projections and recesses (unevenness), so as to increase the filling density of the filler alloy. Namely, the thinner the filler alloy is, the smaller the change in the thickness of the tube before and after the brazing is made, and therefore locally unbonded parts are not likely to occur, even in a case of multi-stage. However, since thin application of a filler alloy means a decrease in the amount of the filler alloy, depletion of the filler takes place, even though locally unbonded parts can be prevented from occurring. Further, if the applied filler alloy has microscopic unevenness, gaps are liable to occur between the fin and the tube after the brazing, because the fin is in contact with the projections (projected areas) of the filler alloy when the core is assembled into a heat exchanger, as described above. The filling density of the filler alloy mentioned above is defined such that, when the filler alloy is present fully between the surface of a tube and the maximum height of the deposited filler alloy shown in FIG. 3 the filling density of the filler alloy is 100%. There is a tendency that the more deeply the unevenness of the filler alloy are formed, the smaller the filling density is. In the case of brazing sheets conventionally used in brazing, the filling density is about 100%. On the other hand, in the case of tubes metal-sprayed with a filler alloy, the metal-sprayed amount of the filler alloy is about 25 g/m² (the possible minimum amount in brazing with a conventional Al/12% Si alloy), with the height of the filler alloy being 50 μm or more (the height of the filler alloy (average filler alloy height) is about 8 μm if the filler alloy is deposited with the filling density being 100%), and the filling density is 20% or less, which is a great decrease.

SUMMARY OF THE INVENTION

Therefore, an object of the present invention is to provide an aluminum alloy tube stabilized in brazability.

More specifically, another object of the present invention is to provide an aluminum alloy tube whose outer surface is covered with a filler alloy by metal-spraying, and which does not allow locally filler-unbonded parts to be formed when such tubes and corrugated fins are combined into a core to assemble a heat exchanger by brazing.

A further object of the present invention is to provide a heat exchanger excellent in brazability and corrosion resistance.

A still further object of the present invention is to provide a method for metal-spraying a filler alloy that can, for example, give an aluminum alloy tube excellent in brazability.

More specifically, a further object of the present invention is to provide a method for metal-spraying a filler alloy that can form a filler alloy layer that is uniform, high in the filling density of the filler alloy, and low in microscopic unevenness.

Other and further objects, features, and advantages of the invention will appear more fully from the following description, taken in connection with the accompanying drawings.

DETAILED DESCRIPTION OF THE INVENTION

Figure 1:
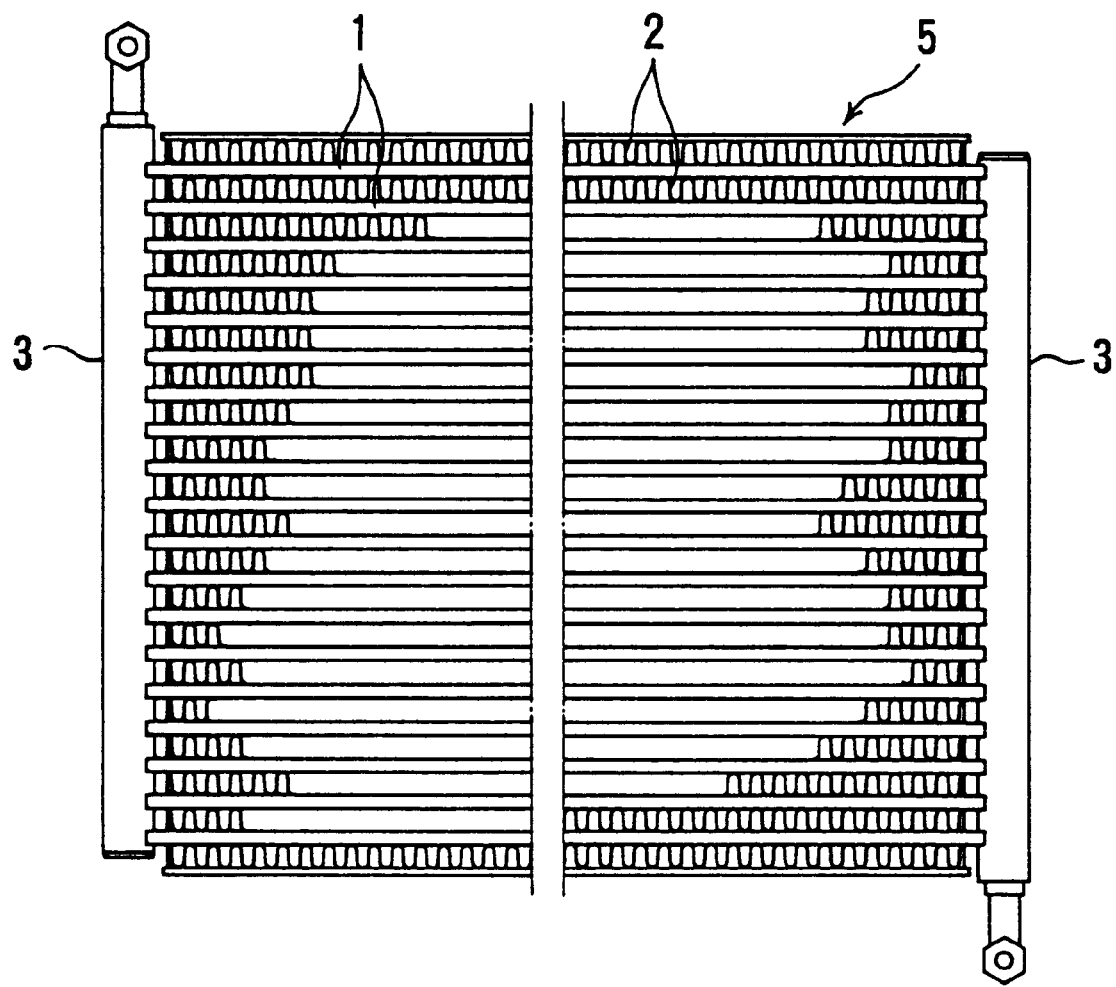
FIG. 1 is a front view of an example of a condenser.

The above objects have been attained by the following inventions:

(1) An aluminum alloy tube whose outer surface is covered with a filler alloy by metal-spraying, wherein the base material of the tube has an uneven rough surface with the depth of 10 $\mu$m or more, and the difference between the highest projection of the base material surface and the highest projection of the filler alloy layer covering it is 3 to 25 $\mu$m;

(2) The aluminum alloy tube as stated in the above (1), wherein the filler alloy is an aluminum alloy containing 15 to 50% Si by weight;

(3) A method of producing an aluminum alloy tube, comprising covering the outer surface of a tube base material obtained by extrusion with a filler alloy by metal-spraying, wherein the base material surface of the tube before metal-spraying has unevenness with the depth of 10 $\mu$m or more on the surface of the tube base material, and giving a reduction of some percents by, for example rolling, to the tube covered with the filler alloy, to make the difference between the highest projection of the tube base material surface and the highest projection of the filler alloy layer covering it from 3 to 25 $\mu$m;

(4) A heat exchanger, assembled by using the aluminum alloy tubes in the above (1) or (2);

(5) A method of metal-spraying, comprising metal-spraying an aluminum alloy filler powder in a melted state, by the high-velocity flame metal-spraying process, in which the aluminum alloy filler contains 15 to 50% Si by weight, and the alloy powder is mainly made up of particles whose diameter is 10 $\mu$m or more, but 70 $\mu$m or less;

(6) The method of metal-spraying as stated in the above (5), wherein the aluminum alloy filler contains 15 to 50% Si by weight and 60% Zn by weight or less, with the total of the Si and the Zn being 90% by weight or less;

(7) A method of producing an aluminum alloy tube whose outer surface is covered with a filler alloy by metal-spraying, comprising metal-spraying a filler alloy by the method in the above (5) or (6);

(8) The aluminum alloy tube as stated in the above (1) or (2), wherein the outer surface is covered by metal-spraying with an aluminum alloy filler powder in a melted state, by the high-velocity flame metal-spraying process, in which the aluminum alloy filler contains 15 to 50% Si by weight, and the alloy powder is mainly made up of particles whose diameter is 10 $\mu$m or more, but 70 $\mu$m or less;

(9) The aluminum alloy tube as stated in the above (1) or (2), wherein the outer surface is covered by metal-spraying with an aluminum alloy filler powder in a melted state, by the high-velocity flame metal-spraying process, in which the aluminum alloy filler contains 15 to 50% Si by weight and 60% Zn by weight or less, with the total of the Si and the Zn being 90% by weight or less, and the alloy powder is mainly made up of particles whose diameter is 10 $\mu$m or more, but 70 $\mu$m or less; and

(10) A heat exchanger, assembled by using aluminum alloy tubes, wherein the aluminum alloy tubes are obtained by covering the outer surface with a filler alloy by metal-spraying by the method in the above (5) or (6).

The inventors of the present invention have first studied locally unbonded parts, to solve the above-described problems, and it is assumed that the mechanism of the occurrence of locally unbonded parts is as follows.

Hereinbelow, the mechanism of the occurrence of locally unbonded parts is described with reference to the figures.

Figure 3A:
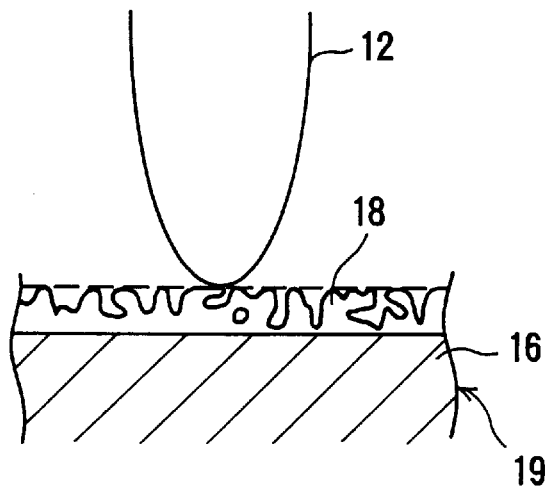
FIGS. 3A, 3B, and 3C are partial schematic views illustrating a way of the mechanism how a locally unbonded part shown in FIG. 2 is formed.
Figure 3B:
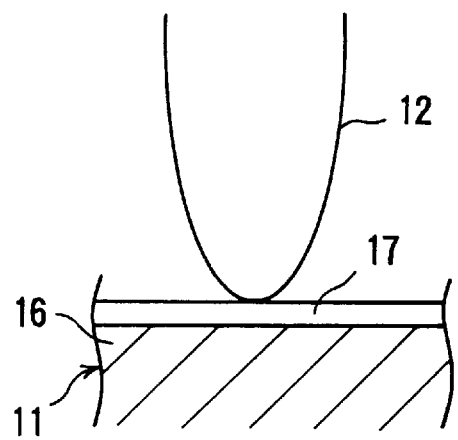
Figure 3C:
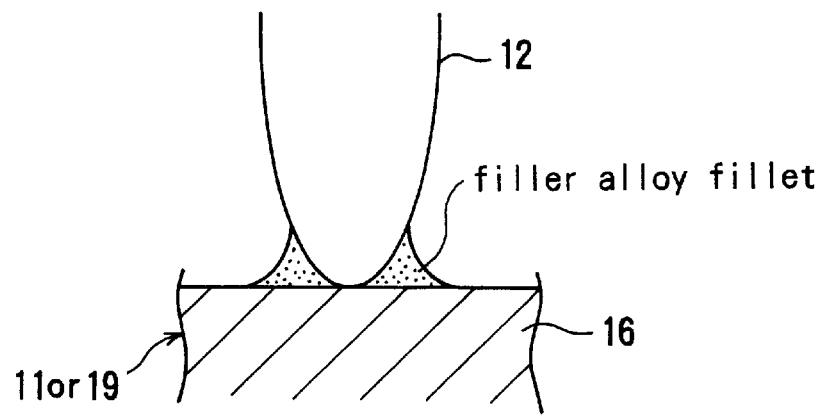

FIGS. 3A, 3B, and 3C are partial schematic views of the relationship between a tube 11 and a fin 12 of an assembled core before and after the brazing.

Figure 2:
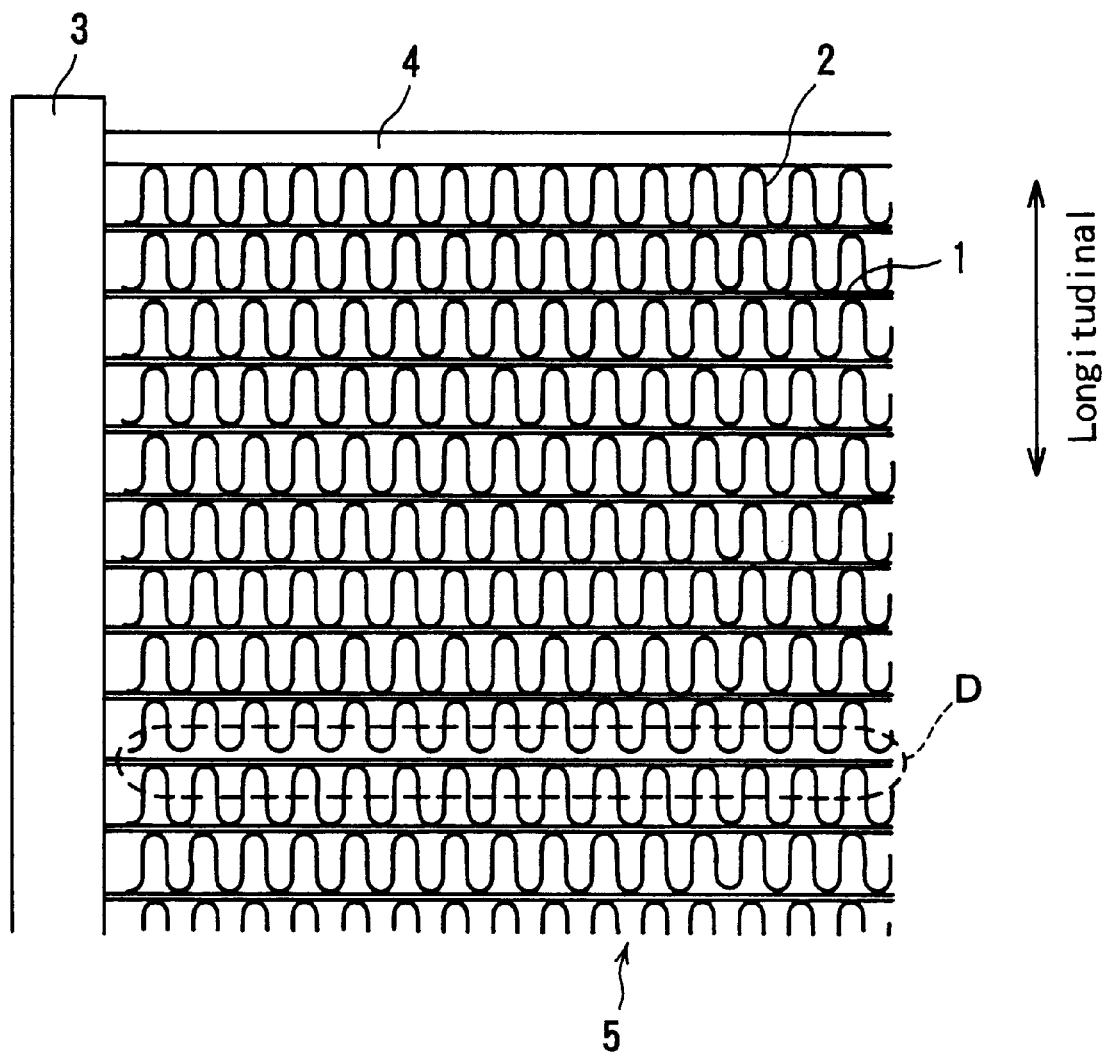
FIG. 2 is a schematic view of a condenser having a failure.

The distance between a core alloy 16, of the tube 11, and the fin 12—of an assembly of the tube 11, made of a brazing sheet by electric-resistance welding, and the fin 12 (the thickness of a filler alloy layer 17 of the brazing sheet)—is on the order of 20 $\mu$m (FIG. 3B). On the other hand, in the case of a tube 19 in which a filler alloy is sprayed, the distance between a core alloy 16, of the tube 19, and the fin 12 (the apparent thickness of a filler alloy layer 18), is increased to on the order of 100 $\mu$m (FIG. 3A), for the same amount of the filler alloy, since the filling density is low, because of the presence of microscopic unevenness and cavities in the filler alloy layer 18. When these assemblies are heated for brazing, the filler alloy layer forms fillets, and in either case the core alloy 16 and the fin 12 come in contact with each other (FIG. 3C), and the length of the core after the brazing is shrunk longitudinally by the thicknesses of the filler alloy layers (see FIG. 2). This shrinkage is about 40 $\mu$m per tube (2×20 $\mu$m on one surface), in the case of the tube 11 made of a brazing sheet, whereas the shrinkage is about 200 $\mu$m per tube (2×100 $\mu$m on one surface) in the case of the tube 19, having the filler alloy layer 18 formed by metal-spraying. Thus the total shrinkage due to tens of tubes amounts to several millimeters, which causes a locally unbonded part D.

Further, if there is microscopic unevenness in the filler alloy, when the core is assembled into a heat exchanger, the fins come in contact with projections of the filler alloy, and a gap is apt to be formed between the fins and the tubes after the brazing, as is shown in FIG. 3A.

As is described above, it is seen that a locally unbonded part can be prevented from being formed by decreasing the amount of the filler alloy, reducing microscopic unevenness of the filler alloy layer, and increasing the filler density of the filler alloy layer. However, even if the amount of the filler alloy is reduced to prevent a locally unbonded part from being formed, then depletion of the filler alloy occurs. Even if the amount of the filler alloy is small, fillets are formed and brazing can be carried out favorably when the filler alloy is deposited uniformly. It is, however, difficult to deposit a filler alloy uniformly by the conventional metal-spraying method.

A first embodiment of the present invention is an aluminum alloy tube whose outer surface is covered with a filler alloy by metal-spraying, wherein the tube base material surface has an uneven surface with a specified depth of unevenness, and the difference between the highest projection of the base material surface and the highest projection of the filler alloy layer covering it is in a specified range.

Figure 4:
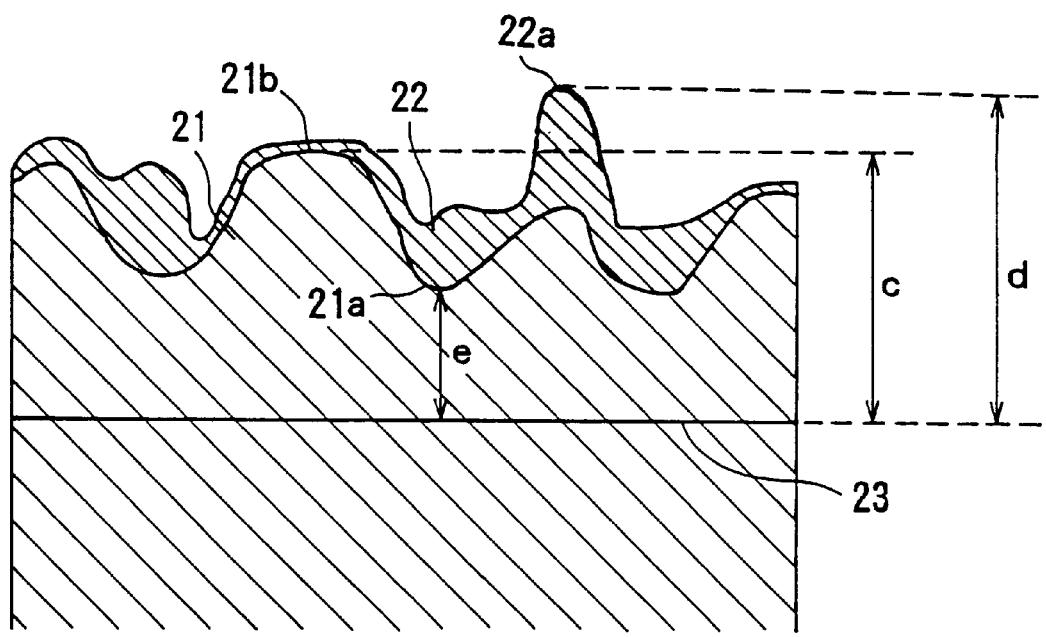
FIG. 4 is an illustration of the tube of the present invention covered with a filler alloy.

The inventors of the present invention have found that, to prevent locally unbonded parts from being formed while using a filler alloy for covering in an amount sufficient not to cause its depletion (in an amount of the filler alloy to result in an average thickness of 8 µm or more), it is suitable to provide a tube with unevenness and deposit the filler alloy mainly in the recesses of the tube, as shown in FIG. 4. The constitution of the surface of the tube of the present invention is shown in FIG. 4.

In the figure, 21 indicates the surface of a tube base material, 21a indicates the deepest recess of the recesses in the base material surface, and 21b is the highest projection of the projections. 22 indicates a filler alloy clad on the base material surface, and 22a indicates the highest projection of the projections of the filler alloy. 23 indicates a reference line in the tube base material. Herein, it is required that the following relationship between the distances c, d, and e be observed:

$$c-e \geq 10 \ \mu m$$

$$d-c = 3 \text{ to } 25 \ \mu m$$

Herein, the distance (c−e) is the depth of the uneven rough surface.

As is shown in FIG. 4, before the brazing, a fin is brought in contact, at the part indicated at 22a in the figure, with the tube having the filler alloy, and at the time of the brazing, the fin is brought in contact, at the part indicated at 21b in the figure, with the tube. Therefore, the change in the size before and after the brazing is made small, and locally unbonded parts can be prevented from forming.

Further, the inventors of the present invention have found a filler alloy excellent in brazability. Further, according to the use of the filler alloy, we have solved the above problems, by preventing locally unbonded parts from being formed, with the amount of the filler alloy being reduced, and by increasing the filling density of a filler alloy layer and reducing unevenness of the filler alloy layer, by metal-spraying a powder of the above filler alloy by the high-velocity flame metal-spraying method.

First, the aluminum alloy tube of the present invention is described.

The tube of the present invention is an aluminum alloy tube made by metal-spraying a filler alloy on the outer surface of an aluminum alloy tube made by extrusion. Herein, the extrusion may be any of direct extrusion, indirect extrusion, and conform extrusion. As the material of the tube, any aluminum alloy material can be used that can be subjected to brazing and that is good in corrosion resistance. As the tube, preferably a tube for aluminum alloy heat exchangers, and an extruded multiple-holed tube and a pipe for piping, can be mentioned.

In the tube of the present invention, the base material is required to have a prescribed uneven surface. The unevenness is required for preventing locally unbonded parts from being formed when a heat exchanger is produced, as described above. It is suitable that the tube itself has the above specified unevenness, and if the tube does not have such unevenness, the surface of the tube is worked to have such unevenness. As the method for forming unevenness, can be mentioned, for example, a method in which unevenness is formed on a mold for extrusion, and a method in which unevenness is formed by sandblasting or by action of a wire brush after extrusion. In the sandblasting, recesses are formed first, and after sufficient sandblasting, the flat surface almost disappears, and the surface becomes an uneven surface. The unevenness is nonuniform, and in some cases there are tiny projections in the recesses. In the case of use of a wire brush, unevenness in the form of streaks are formed. Desirably, the depth of the unevenness is 10 µm or more, but 60 µm or less. If the depth is less than 10 µm, there is no effect for preventing locally unbonded parts from being formed, whereas if the depth is over 60 µm, the unevenness are too deep to allow the filler alloy to go to form sufficient fillets, in some cases.

In the aluminum alloy tube of the present invention, the metal-spraying is preferably the high-velocity flame metal-spraying. The reason why this flame metal-spraying is preferable is that, since the energy of the metal-spraying is large, the filler alloy is melted at the time of the metal-spraying, to deposit on the tube, thereby allowing the filler alloy to collect easily in the recesses of the tube.

In the aluminum alloy tube of the present invention, preferably the filler alloy for metal-spraying is an aluminum alloy containing Si 15 to 50% by weight. By allowing the Si content to be higher than that of usual filler alloys, the depletion of the alloy filler does not occur even when the amount of the filler alloy to be metal-sprayed is decreased. The decrease in the amount of the filler alloy for metal-spraying results in the effect for preventing locally unbonded parts from being formed. Elements other than Si, such as Zn, Fe, Cu, Mn, In, and Sn, may be added, in a range wherein the brazability is not affected, for the purpose for improving, for example, the corrosion resistance. For example, Zn may be added, generally in an amount of 60% by weight or less, and preferably up to about 40% by weight, without causing any problems.

The amount of the filler alloy to be metal-sprayed is preferably 40 g/m² or less, and more preferably 25 g/m² or less. This is because the smaller the filler alloy is, the higher is the effect of preventing locally unbonded parts from being formed. The lower limit of the amount of the filler alloy may be in the range wherein the depletion of the filler alloy does not occur, and when a filler alloy containing Si 15% by weight is metal-sprayed, although the lower limit of the filler alloy to be metal-sprayed is on the order of 20 g/m², if the amount of Si in the filler alloy is increased further, depletion of the filler alloy does not occur, even when the amount of the deposited filler alloy is reduced.

Preferably, after being metal-sprayed, the aluminum alloy tube of the present invention is rolled for pressing at a small rolling reduction, so the projections of the filler alloy deposited on the tube surface may be depressed. That is, the tube of the present invention can be produced, for example, in such a manner that a tube immediately after the extrusion which is usually flat-shape, is formed with unevenness with a prescribed depth defined in the present invention, a filler alloy is metal-sprayed on the base material surface of the tube, and then the tube is passed, for example, between rollers, so that the difference between the highest projection of the base material surface of the tube and the highest projection of the filler alloy layer may be adjusted to fall in the range of the prescribed value defined in the present invention. If a tube after extrusion already has unevenness with the prescribed depth, the step of forming unevenness can be omitted.

Thus, by bringing the difference between the highest projection of the base material surface of the tube and the highest projection of the filler alloy layer to 3 to 25 $\mu$m, a tube excellent in brazability can be obtained. If the difference between the highest projection of the base material surface of the tube and the highest projection of the filler alloy is less than 3 $\mu$m, depletion of the filler alloy due to the lack of the filler alloy occurs, whereas if it is over 25 $\mu$m, locally unbonded parts are formed. Preferably, the difference between the highest projection of the base material surface of the tube and the highest projection of the filler alloy, is 5 to 20 $\mu$m.

The depth of the unevenness of the tube base material, and the difference between the highest projection of the base material surface of the tube and the highest projection of the filler alloy, may be found by abrading a section of the tube at 10 positions or more, and observing the central part in the direction of the width of the tube, by enlarging 100 times under an optical microscope. The reason the section is abraded at 10 positions or more is that the deposition by the metal-spraying scatters highly, and that, if the difference between the highest projection of the base material surface of the tube and the highest projection of the filler alloy is 3 to 25 $\mu$m on average, the brazing is carried out without any trouble.

The aluminum alloy tube covered with a filler alloy of the present invention makes possible the production of a heat exchanger excellent in brazability and corrosion resistance by assembling a core. The aluminum alloy rube of the present invention is stable in brazability, and when the tubes are combined with corrugated fins, to form a core to assemble a heat exchanger, locally filler-unbonded parts are not formed by brazing.

The aluminum alloy tube of the present invention is characterized in that the filler alloy layer has a thickness with a prescribed value. To control the thickness of the filler alloy layer, the metal-spraying method is preferably the method of metal-spraying with a filler alloy according to the present invention.

A second embodiment of the present invention for preventing a tube from having locally unbonded parts, is an improvement in a filler alloy powder for metal-spraying and a metal-spraying method, and it is directed to the production of an aluminum alloy tube by the method of the present invention for metal-spraying with a filler alloy that can form a highly dense and uniform filler alloy layer with the amount of the filler alloy reduced by using a specified filler alloy powder. Hereinbelow, this embodiment is described in detail.

This metal-spraying method uses, as a filler alloy powder, an aluminum alloy powder containing Si 15 to 50% by weight. This content of Si is large in comparison with the conventional content of about 10% by weight.

The reason such a large amount of Si is contained is that, when the content of Si is large, fillets are formed with a smaller amount of the filler alloy, and the brazing is made favorably. This is because the base material is melted, such that the base material has an amount of Si that brings about an eutectic composition. Therefore, since the amount of the filler alloy to be metal-sprayed is only about 20 to 70% of the conventional filler alloy containing about 10% by weight of Si, locally unbonded parts are prevented from being formed.

The reason the content of Si in the filler alloy is prescribed to be 15 to 50% by weight, is that, if the content is too small, fillets are not well formed, and if a larger amount of the filler alloy is metal-sprayed, to try to form fillets, the height of the filler alloy layer is increased, thereby leading to the formation of locally unbonded parts. On the other hand, if the content is too large, the melting point of the filler alloy is too elevated, the filler alloy powder is not melted at the time of metal-spraying, and as a result the filling density of the filler alloy layer is lowered, thereby forming large projections and recesses, which are not preferable for the filler alloy layer.

In passing, in this metal-spraying method, the reason a powder is used as a raw material for metal-spraying, is that it is difficult to feed a wire rod, since the filler alloy used in the present invention has a high content of Si.

In this metal-spraying method, the reason the particle diameter of the filler alloy powder is preferably controlled to be mainly 10 $\mu$m or more, but 70 $\mu$m or less, is that, if the particle diameter is too small, the filler alloy is oxidized during the metal-spraying, thereby not playing its role in the brazing, whereas if the particle diameter is too large, the particles remain unmelted in some cases, since the filler alloy for use in the present invention is increased in the content of Si for the reason described above, and therefore the alloy has a high melting point. If large particles of 70 $\mu$m or more are deposited with them remaining unmelted during metal-spraying, the height of the filler layer is increased partially (to lower the filling density), to form locally unbonded parts, in some cases. In view of the brazability, it is recommended particularly that the particle diameter be in the range of 30 $\mu$m or more, but 70 $\mu$m or less.

In this metal-spraying method, the expression "the filler alloy powder comprises mainly a powder having a particle diameter of 10 $\mu$m or more, but 70 $\mu$m or less" means that the particles having the above given particle diameter occupy 70% by weight or more among all the particles, and under this condition, brazability (adhesion) without practical problems can be obtained. Locally unbonded parts are formed at the time of brazing as a result of the accumulation of gaps formed between the tubes and the fins that are in contact with one another, but if the powder having the above particle diameter amounts to 70% by weight or more, the height of the filler alloy at almost every part where the tube and the fin are in contact with one another can be lowered, and there are no problems, in practice.

Moreover, although, generally, as a filler alloy powder for metal-spraying, one having an average particle diameter in the range of 10 to 200 μm is used, such a powder wherein only the average particle diameter is controlled causes locally unbonded parts to be formed, in many cases. In particular, a powder having an average particle diameter of 50 to 150 μm that is preferably generally used, is apt to form locally unbonded parts.

Further, one having an average particle diameter of 70 μm or more is physically impossible to be a filler alloy powder having a particle diameter in the range of 10 μm or more, but 70 μm or less, used in this metal-spraying method, and furthermore, even if the average particle diameter is 50 μm, unless the distribution of particle diameters of the powder is not arranged, usually the powder does not become a filler alloy powder having a particle diameter in the range of 10 μm or more, but 70 μm or less.

In this metal-spraying method, the reason the high-velocity flame metal-spraying process is used for the metal-spraying with the above filler alloy powder is as follows. In the high-velocity flame metal-spraying method, the (flame) metal-spraying temperature is high (generally 2,500 to 3,000° C.) and the jet speed is high (generally 1,300 to 2,100 m/s). Therefore, even the high-melting filler alloy powder used in the metal-spraying method of the present invention can be violently struck against and spread on the base material (tube), with the powder in a melted state at the time of metal-spraying, to form a filler alloy layer low in height, with the layer having a high filling density, so that depletion of the filler alloy does not occur, and locally unbonded parts can be prevented from being formed. The high velocity flame metal-spraying process itself is a method known to one skilled in the art (see M. Nakagawa et al., *Hyomen Gijutsu*, pp. 38–45 (124–131), Vol. 46, No. 2, 1995).

In order to make the filler alloy melted state at the time of metal-spraying, it is important to use the filler alloy powder whose particle diameter is in the above specific range, and the melted state of the filler alloy can be achieved by optimally determining the conditions, such as gas (e.g. oxygen) balance, distance to be metal-sprayed, etc., depending on the metal-spraying apparatus used, using the specific filler alloy powder.

Parenthetically, in the conventionally used arc metal-spraying method, although the filler alloy is melted, since the jet speed is low, the filler alloy is not satisfactorily spread on the base material, and the filler alloy layer becomes high, to form locally unbonded parts, in some cases.

In another embodiment of this metal-spraying method, as the filler alloy, an aluminum alloy containing Si 15 to 50% by weight and Zn 60% by weight or less, with the total of them being 90% by weight or less, is used. Si has the same action and effect as described before, and Zn improves the corrosion resistance and lowers the melting point of the filler alloy. When the content of Zn is increased, the workability and the like are lowered, and therefore the content is to be 60% by weight or less. The reason the total content of Si and Zn is to be 90% by weight or less, is to improve the wettability between the base material and the filler alloy, by allowing Al to be contained in an amount of at least 10% by weight.

In this metal-spraying method, as elements other than Si and Zn, for example, Fe, Cu, Mn, In, and Sn may be added, in amounts in a range wherein brazability is not affected, in order to improve the corrosion resistance and the like.

The amount of the filler alloy to be metal-sprayed is preferably 40 g/m$^2$ or less, and particularly preferably 25 g/m$^2$ or less. This is because the smaller the amount of the filler alloy is, the less likely it is that locally unbonded parts will be formed.

The lower limit of the amount of the filler alloy to be metal-sprayed can be determined in the range where depletion of the filler alloy does not occur. When a filler alloy containing Si 15% by weight is used, the lower limit is the order of 20 g/m$^2$. When the amount of Si in the filler alloy is increased, depletion of the filler alloy does not occur, even if the amount of the deposition is decreased.

This metal-spraying method is particularly useful when an aluminum alloy tube is covered with a filler alloy by metal-spraying, as described in the above. For example, the outer surface of an extruded aluminum alloy tube is metal-sprayed with a filler alloy powder. Herein, the extrusion may be any of direct extrusion, indirect extrusion, and conform extrusion. The material of the tube may be an aluminum alloy that can be subjected to brazing and that has corrosion resistance. As the most recommended tube, a tube for aluminum alloy heat exchangers and an extruded multiple-holed tube and a pipe for piping can be mentioned. In passing, particularly preferably, this metal-spraying method is applied in the embodiment described above.

In carrying out this metal-spraying method, in the same manner as described above with reference to FIG. 4, a tube already having unevenness on the tube surface may be used, or alternatively, the tube surface to be metal-sprayed may be made uneven by blasting before the metal-spraying, and either of these two cases improves the adhesion of the filler alloy to the tube base material at the metal-spraying.

The aluminum alloy tube and the method of metal-spraying with a filler alloy of the present invention are different from those of the conventional techniques, in that they have nothing to do with the problems of depletion of a filler alloy or the formation of locally unbonded parts, due to high or low covering amount in brazing.

Further, according to this method for metal-spraying with a filler alloy, an aluminum alloy tube can be metal-sprayed and covered with a filler alloy favorably, and therefore a tube excellent in brazability and high in corrosion resistance can be obtained. In the heat exchanger obtained by using such tubes, the adhesion between the tubes and the fins is excellent, locally unbonded parts are not likely to be formed, and therefore the corrosion resistance is excellent.

The present invention is described in more detail with reference to the following examples, but the present invention is not limited thereto.

EXAMPLES

Example 1

Each cylindrical billet of JIS A1050 aluminum was extruded into a multiple-holed flat-shape pipe (having a height of 1.8 mm, a width of 16 mm, and 19 holes), and then the multiple-holed flat-shape pipe was cold-sandblasted, to obtain a tube having unevenness of about 20 μm. Both surfaces of the tube were metal-sprayed with a filler alloy powder (produced by the nitrogen gas atomizing method and having a particle diameter of 100 μm or less) of an Al/22 wt. % Si/20 wt. % Zn alloy (containing 0.3 wt. % or less of impurities), by the high-velocity flame metal-spraying method, so that the amount of the deposited filler alloy after the metal-spraying per surface would be 5 to 50 g/m$^2$. In the high-velocity flame (oxygen fuel) metal-spraying, a mixed gas of propylene gas, oxygen, and air (150 psi, 100 psi, and 80 psi, respectively) was used. The feed of the powder in the metal-spraying was controlled so that the average thickness of the filler alloy on 300 mm length of the tube would have a prescribed amount of the deposited filler alloy. Herein, the average thickness of the filler alloy is the value obtained by dividing the value found by dividing the deposited weight of the filler alloy by the density of the filler alloy, by the whole outer surface area of the tube subjected to the metal-spraying excepting the end surfaces of the tube.

Each of some of the obtained filler alloy-covered tubes was rolled with a roll gap being 1.8 mm, to prepare a sample.

Further, as Conventional Example and Comparative Examples, in the same manner as above, tubes immediately after extrusion were metal-sprayed with a filler alloy powder of an Al/12 wt. % Si/5 wt. % Zn alloy (containing 0.3% by weight or less of impurities) while they were hot, to prepare samples.

20 positions on a section of each of the thus-prepared tubes were observed at the central part in the direction of the width of the tube under an optical microscope with them enlarged 100 times, and the depth of the unevenness of the tube base material and the difference between the highest projection of the tube base material surface and the highest projection of the filler alloy were determined. The results are shown in Table 1.

The obtained multiple-holed tubes were cut into tubes having a length of 580 mm. The resulting tubes, corrugated fins made of an Al/0.5 wt. % Si/1 wt. % Fe/0.5 wt. % In/2 wt. % Zn alloy and having a thickness of 0.07 mm, and header pipes of 3003 alloy were combined to assemble two heat exchanger cores shown in FIG. 1. The resulting cores were coated with a fluoride-series flux and were brazed by heating in a nitrogen atmosphere under the condition of 595° C. for 3.5 min.

The outer appearance of the thus-prepared cores was observed, to determine whether or not there was any locally unbonded part. The results are shown in Table 2. A tube with a fin having 20 corrugations was cut out of a part of one of the cores where no locally unbonded part was observed in appearance, and then the brazed state was evaluated in terms of the bonding rate of the fin. That is, when the tube was removed from the fin and if it was observed that the bonding was complete, the bonding rate was assumed to be 100%. The bonding rate of one having locally unbonded parts was calculated as follows: Bonding rate (%)=[(the length of the bonded part)/(the length of the bonded part+the length of the unbonded part)]×100

The results are shown in Table 2.

Further the other core was subjected to the CASS test to determine the corrosion resistance. The results of the test are shown in Table 2.

TABLE 1

| | No. | Tube before metal-sprayed | Metal-spraying condition | Filler alloy used in metal-spraying | Deposited amount of filler alloy | Average thickness of filler alloy | Rolling | Deph of unevenness in base material surface | Difference between the highest projection of base material surface and the highest projection of filler alloy |
|---|---|---|---|---|---|---|---|---|---|
| Example of this invention | 1 | Blasted | Cold | Al-22% Si-20% Zn | 12 g/m$^2$ | 4 μm | Done | 20 μm | 7 μm |
| | 2 | Blasted | Cold | Al-22% Si-20% Zn | 25 g/m$^2$ | 9 μm | Done | 30 μm | 20 μm |
| Comparative Example | 3 | Blasted | Cold | Al-22% Si-20% Zn | 5 g/m$^2$ | 2 μm | Done | 20 μm | 1 μm |
| | 4 | Blasted | Cold | Al-22% Si-20% Zn | 45 g/m$^2$ | 16 μm | Done | 32 μm | 45 μm |
| | 5 | Blasted | Cold | Al-22% Si-20% Zn | 12 g/m$^2$ | 4 μm | None | 19 μm | 60 μm |
| | 6 | Blasted | Cold | Al-22% Si-20% Zn | 25 g/m$^2$ | 9 μm | None | 19 μm | 70 μm |
| | 7 | Not blasted | Hot | Al-12% Si-5% Zn | 20 g/m$^2$ | 7 μm | None | 1 μm | 60 μm |
| Conventional Example | 8 | Not blasted | Hot | Al-12% Si-5% Zn | 45 g/m$^2$ | 16 μm | None | 1 μm | 100 μm |

TABLE 2

| | No. | Locally unbonded part | Bonding rate of fin (%) | Result of CASS test (1500 h) |
|---|---|---|---|---|
| Example of this invention | 1 | None | 100 | No through-hole corrosion was observed |
| | 2 | None | 100 | No through-hole corrosion was observed |
| Comparative Example | 3 | None | 15 | Through-hole corrosion was observed |
| | 4 | Observed | 100 | Through-hole corrosion was observed |
| | 5 | Observed | 100 | Through-hole corrosion was observed |
| | 6 | Observed | 100 | Through-hole corrosion was observed |
| | 7 | Observed | 100 | Through-hole corrosion was observed |
| Conventional Example | 8 | Observed | 100 | Through-hole corrosion was observed |

The tubes of the present invention did not have locally unbonded parts formed, and they were high in the bonding rate of the fin and good in corrosion resistance.

In contrast, in Conventional Example and Comparative Examples, locally unbonded parts were formed and depletion of the filler alloy occurred. Therefore, in the corrosion test, through-pit corrosion took place.

The particle diameter distribution of each filler alloy powder used was as follows.

Particle diameter distribution of the Al/22 wt. % Si/20 wt. % Zn alloy powder: 10 to 30 $\mu$m 10 wt. %, 30 to 70 $\mu$m 90 wt. %.

Particle diameter distribution of the Al/12 wt. % Si/5 wt. % Zn alloy powder: 10 to 30 $\mu$m 10 wt. %, 30 to 70 $\mu$m 30 wt. %, 70 to 150 $\mu$m 55 wt. %, 150 $\mu$m or more 5 wt. %.

In the metal-spraying of the Al/22 wt. % Si/20 wt. % Zn filler alloy, the melted state of the filler alloy powder at the metal-spraying was controlled by adjusting the distance from the metal-spraying gun to the base material. In Nos. 1 to 4, the filler alloy was melted, and in Nos. 5 to 6, the filler alloy was not melted completely. In Nos. 7 and 8, since the particle diameter of the powder was too large, the non-melted powder remained regardless of the distance.

Example 2

Each cylindrical billet of JIS A1050 aluminum alloy was extruded into a multiple-holed flat-shape pipe (having a height of 1.8 mm, a width of 16 mm, and 19 holes). Then, both surfaces of the multiple-holed flat-shape pipe were cold-blasted, and then the resultant both surfaces were metal-sprayed with a filler alloy powder having the composition and particle diameter shown in Table 3, by the high-velocity flame metal-spraying method. In the metal-spraying flame (oxygen fuel), a mixed gas of propylene gas, oxygen, and air (150 psi, 100 psi, and 80 psi, respectively) was used. The metal-sprayed amount was made in the range that the average metal-sprayed amount after the metal-spraying was 5 to 50 g/m$^2$ per surface. The feed of the powder in the metal-spraying was controlled so that the average amount of the filler alloy on a length of 300 mm of the tube would have a prescribed amount of the deposited amount of the filler alloy. The filler alloy powder for the metal-spraying was produced by the nitrogen gas atomization method, and it was used after classification. The amount of impurity elements contained in the filler alloy powder was 0.3% by weight or less. The composition and the particle diameter distribution of the filler alloy powder used in the metal-spraying, and the amount of the filler alloy deposited on the multiple-holed pipe are shown in Tables 3 and 4. By the metal-spraying, in Examples 9 to 18 (this invention), and Comparative Examples 19, 21, 22, and 23, the filler alloy powder was coated on the multiple-hole pipe in a melted state, while in Comparative Example 20 and Conventional Examples 24 and 25, the filler alloy was coated on the multiple-hole pipe in an unmelted particle state at the time of metal-spraying.

The thus-obtained multiple-holed tubes were rolled, straightened, and then cut into tubes having a length of 580 mm. The resulting tubes, corrugated fins made of an Al/0.5 wt. % Si/1 wt. % Fe/0.5 wt. % In/2 wt. % Zn alloy and having a thickness of 0.07 mm, and header pipes of 3003 alloy were combined, to assemble two heat exchanger cores each having 40 stages as shown in FIG. 1. The resulting cores were coated with a fluoride-series flux, and they were brazed by heating in a nitrogen atmosphere, under the condition of 595° C. for 3.5 min.

The outer appearance of the thus-prepared cores was observed, to determine whether or not there was any locally unbonded part.

A tube with a fin having 20 corrugations was cut out of a part of one of the cores where no locally unbonded part was observed in appearance, and the bonding rate was found. By removing the fin from the tube and measuring the length of the bonded part A and the length of the unbonded part B, the bonding rate was obtained according to the formula: {[A/(A+B)]×100} wherein A is the length of the bonded part and B is the length of the unbonded part. The other core was subjected to CASS test, to determine the corrosion resistance. The results are shown in Tables 5 and 6.

TABLE 3

| Classification | No | Filler Alloy (wt %, balance Al) | | | Particle diameter distribution of filler alloy (wt %) | | | | | Deposited amount of filler alloy (g/m$^2$) |
|---|---|---|---|---|---|---|---|---|---|---|
| | | Si | Zn | Other | ~10 $\mu$m | 10 ~ 30 $\mu$m | 30 ~ 70 $\mu$m | 70 ~ 150 $\mu$m | 150 $\mu$m ~ | |
| Example of this invention | 9 | 35 | 0 | — | 0 | 10 | 90 | 0 | 0 | 20 |
| | 10 | 35 | 0 | In: 0.02 | 0 | 10 | 90 | 0 | 0 | 20 |
| | 11 | 20 | 15 | — | 0 | 10 | 90 | 0 | 0 | 20 |
| | 12 | 20 | 15 | — | 10 | 10 | 75 | 5 | 0 | 20 |
| | 13 | 20 | 15 | — | 0 | 15 | 80 | 5 | 0 | 20 |
| | 14 | 20 | 15 | — | 10 | 15 | 75 | 0 | 0 | 20 |
| | 15 | 35 | 40 | — | 0 | 10 | 90 | 0 | 0 | 10 |
| | 16 | 35 | 40 | — | 10 | 15 | 75 | 0 | 0 | 10 |
| | 17 | 25 | 10 | In: 0.02 | 0 | 10 | 90 | 0 | 0 | 15 |
| | 18 | 25 | 10 | In: 0.02 | 10 | 10 | 75 | 5 | 0 | 15 |

TABLE 4

| Classi-fication | No | Filler alloy (wt % balance Al) | | | Particle diameter distribution of filler alloy (wt %) | | | | Deposited amount of filler alloy (g/m²) |
|---|---|---|---|---|---|---|---|---|---|
| | | Si | Zn | Other | ~10 μm | 10 ~ 30 μm | 30 ~ 70 μm | 70 ~ 150 μm | 150 μm ~ | |
| Compara-tive example | 19 | 20 | 15 | — | 80 | 10 | 5 | 5 | 0 | 20 |
| | 20 | 35 | 40 | — | 0 | 5 | 25 | 50 | 20 | 10 |
| | 21 | 35 | 40 | — | 80 | 10 | 5 | 5 | 0 | 10 |
| | 22 | 11 | 5 | — | 0 | 10 | 90 | 0 | 0 | 20 |
| | 23 | 11 | 5 | — | 0 | 10 | 90 | 0 | 0 | 40 |
| Conven-tional example | 24 | 20 | 15 | — | 0 | 10 | 30 | 50 | 10 | 20 |
| | 25 | 11 | 5 | — | 0 | 10 | 30 | 55 | 5 | 60 |

TABLE 5

| Classification | No | Locally unbonded part | Bonding rate of fin (%) | Result of Cass test 1500 hr |
|---|---|---|---|---|
| Example of this invention | 9 | none | 100 | No through-hole corrosion was observed |
| | 10 | none | 100 | No through-hole corrosion was observed |
| | 11 | none | 100 | No through-hole corrosion was observed |
| | 12 | none | 100 | No through-hole corrosion was observed |
| | 13 | none | 100 | No through-hole corrosion was observed |
| | 14 | none | 95 | No through-hole corrosion was observed |
| | 15 | none | 100 | No through-hole corrosion was observed |
| | 16 | none | 95 | No through-hole corrosion was observed |
| | 17 | none | 100 | No through-hole corrosion was observed |
| | 18 | none | 100 | No through-hole corrosion was observed |

TABLE 6

| Classification | No | Locally unbonded part | Bonding rate of fin (%) | Result of Cass test 1500 hr |
|---|---|---|---|---|
| Comparative example | 19 | none | 20 | Through-hole corrosion was observed |
| | 20 | Observed | 100 | Through-hole corrosion was observed |
| | 21 | none | 10 | Through-hole corrosion was observed |
| | 22 | none | 50 | Through-hole corrosion was observed |
| | 23 | Observed | 90 | Through-hole corrosion was observed |
| Conventional example | 24 | Observed | 100 | Through-hole corrosion was observed |
| | 25 | Observed | 100 | Through-hole corrosion was observed |

As is apparent from the results shown in Tables 5 and 6, the tubes (Nos. 9 to 18) produced according to the metal-spraying method of the present invention did not have any locally bonded part formed, and the tubes were high in the bonding rate of the fins and good in corrosion resistance.

In contrast, in Comparative Examples (Nos. 19 to 23) and Conventional Examples (Nos. 24 and 25), formation of locally unbonded parts or lowering in the bonding rate was observed. Therefore the corrosion resistance was deteriorated in these comparative or conventional examples, and through-holes were formed in the tubes.

Having described our invention as related to the present embodiments, it is our intention that the invention not be limited by any of the details of the description, unless otherwise specified, but rather be construed broadly within its spirit and scope as set out in the accompanying claims.

What we claim is:

1. An aluminum alloy tube for a heat exchanger whose outer surface is covered with a filler alloy by metal-spraying, wherein a base material of the tube has an uneven rough surface with a depth of 10 μm or more, and a difference between a highest projection of the base material surface and a highest projection of the filler alloy layer covering it is 3 to 25 μm.

2. The aluminum alloy tube as claimed in claim 1, wherein the filler alloy is an aluminum alloy containing 15 to 50% Si by weight.

3. A heat exchanger, assembled by using the aluminum alloy tubes in claim 1.

4. The heat exchanger as claimed in claim 3, wherein the filler alloy metal-sprayed on the surface of the aluminum alloy tube is an aluminum alloy containing 15 to 50% Si by weight.

5. The aluminum alloy tube as claimed in claim 1, wherein the outer surface is covered by metal-spraying with an aluminum alloy filler powder in a melted state, by the high-velocity flame metal-spraying process, in which the aluminum alloy filler contains 15 to 50% Si by weight, and the alloy powder is mainly made up of particles whose diameter is 10 μm or more, but 70 μm or less.

6. The aluminum alloy tube as claimed in claim 2, wherein the outer surface is covered by metal-spraying with an aluminum alloy filler powder in a melted state, by the high-velocity flame metal-spraying process, in which the aluminum alloy filler contains 15 to 50% Si by weight, and the alloy powder is mainly made up of particles whose diameter is 10 μm or more, but 70 μm or less.

7. The aluminum alloy tube as claimed in claim 1, wherein the outer surface is covered by metal-spraying with an aluminum alloy filler powder in a melted state, by the high-velocity flame metal-spraying process, in which the aluminum alloy filler contains 15 to 50% Si by weight and 60% Zn by weight or less, with the total of the Si and the Zn being 90% by weight or less, and the alloy powder is mainly made up of particles whose diameter is 10 μm or more, but 70 μm or less.

8. The aluminum alloy tube as claimed in claim 2, wherein the outer surface is covered by metal-spraying with an aluminum alloy filler powder in a melted state, by the high-velocity flame metal-spraying process, in which the aluminum alloy filler contains 15 to 50% Si by weight and 60% Zn by weight or less, with the total of the Si and the Zn being 90% by weight or less, and the alloy powder is mainly made up of particles whose diameter is 10 μm or more, but 70 μm or less.

9. The aluminum alloy tube as claimed in claim 1, wherein the amount of filler alloy on the outer surface is 40 g/m$^2$ or less.

10. The aluminum alloy tube as claimed in claim 1, wherein the filler alloy comprises Al, 22 wt % Si and 20 wt % Zn alloy powder, and the filler alloy has a particle diameter distribution of 10 wt % at 10–30 μm and 90 wt % at 30–70 μm.

11. The aluminum alloy tube as claimed in claim 1, wherein the filler alloy comprises Al, 35 wt % Si and 0.02 wt % In, and the filler alloy has a particle diameter distribution of 10 wt % at 10–30 μm and 90 wt % at 30–70 μm.

12. The aluminum alloy tube as claimed in claim 1, wherein the filler alloy comprises Al, 20 wt % Si and 15 wt % Zn alloy powder, and the filler alloy has a particle diameter distribution of 15 wt % at 10–30 μm, 80 wt % at 30–70 μm, and 5 wt % at 70–150 μm.

13. The aluminum alloy tube as claimed in claim 1, wherein the filler alloy comprises Al, 20 wt % Si and 15 wt % Zn alloy powder, and the filler alloy has a particle diameter distribution of 10 wt % at up to 10 μm, 10 wt % at 10–30 μm, 75 wt % at 30–70 μm, and 5 wt % at 70–150 μm.

* * * * *